Nov. 14, 1950   R. E. HEROLD   2,529,552
TUBE COUPLING WITH RUBBER SEAL
Filed May 24, 1946
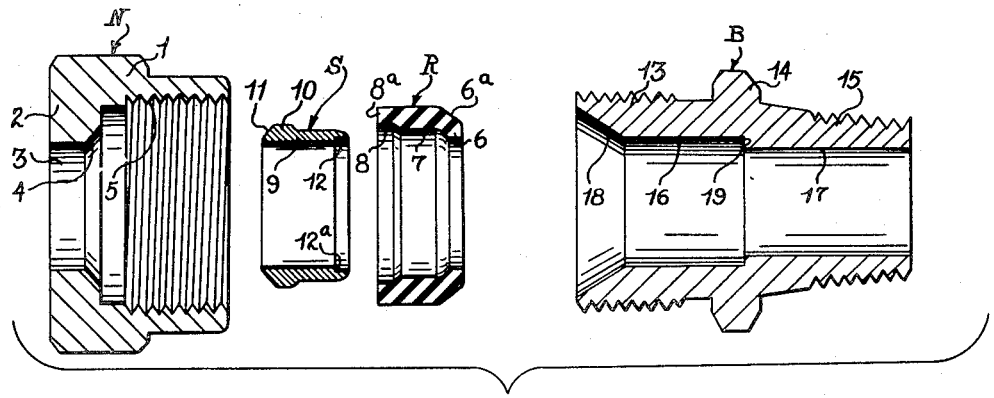
Fig. 1
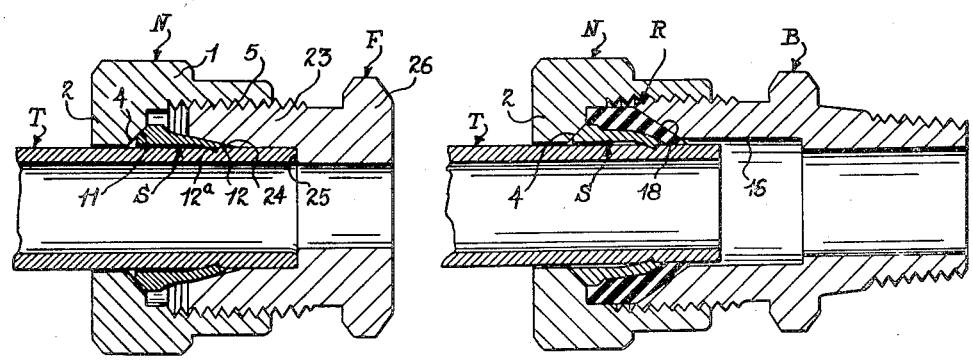
Fig. 2    Fig. 3
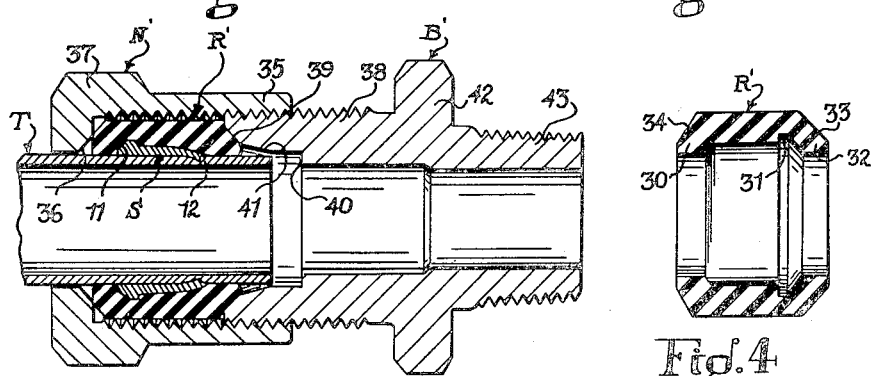
Fig. 5
Fig. 4
INVENTOR.
ROBERT E. HEROLD
BY Richey & Watts
ATTORNEYS Patented Nov. 14, 1950

2,529,552

UNITED STATES PATENT OFFICE 2,529,552

TUBE COUPLING WITH RUBBER SEAL

Robert E. Herold, Cleveland, Ohio, assignor to The Weatherhead Company, Cuyahoga County, Ohio, a corporation of Ohio Application May 24, 1946, Serial No. 671,928

6 Claims. (Cl. 285—90)

This invention relates to a tube coupling, more particularly to a tube coupling provided with a rubber member surrounding a tube gripping member in order to increase the resistance of the joint to failure from sustained vibration under pressure.

I am aware of the fact that the prior art shows fittings in which a tube gripping member is surrounded by a rubber member to resist vibration but it is an object of my invention to produce a greatly superior fitting which will resist a prolonged period of vibration at high pressures without failure. Briefly, I accomplish this object by the provision of a novel coupling wherein a metallic ring member positively grips and bites into the tube wall which ring is surrounded by a rubber member upon which compression forces are exerted by the fitting parts. I have found that such an arrangement produces a fitting which will hold beyond the bursting point of the tube itself without leakage and which will maintain its fluid tight engagement with the tube almost indefinitely under severe vibratory forces and impulse pressure loadings.

It is another object of my invention to provide a fitting which can be assembled for continuous fluid tight engagement even under excessive vibration loading without need for special tools or special deformation of the tube before the fitting is assembled.

Other objects and advantages of my invention will appear as the following detailed description thereof proceeds.

In the drawings:

Fig. 1 is an exploded view of the various parts of one embodiment of my fitting;

Fig. 2 shows how the gripping sleeve is initially set up on the tube with a special fitting part;

Fig. 3 shows my novel fitting assembly including the rubber ring;

Fig. 4 shows a modified form of rubber ring for use with another embodiment; and Fig. 5 shows the other embodiment in assembled relationship.

Referring now to Fig. 1, it can be seen that my fitting includes four basic parts, a nut N, a rubber ring R, a metallic tube biting sleeve S and a body portion B. Nut N has a wrench receiving portion 1 of polygonal section, a radial flange portion 2 and an aperture 3 to receive the tube. Beveled portion 4 may be provided and the nut may be threaded as at 5 for clamping engagement with the body B. The rubber ring R is molded or otherwise formed in a shape designed to produce a good fit with the sleeve S and the nut N.

One such shape includes a radial flange portion 6 having an external tapered surface 6a and portions of two internal diameters as at 7 and 8. The radial surface 8a may be provided on the edge of the ring.

The sealing ring S may be like that employed in certain fittings now on the market. It includes a sleeve portion 9 and an enlarged portion 10 having a tapered surface 11 which may be complementary to the tapered surface 4 on nut N. A portion 12 of reduced section is provided to provide a tube biting shoulder 12a. Body B has a thread portion 13 and a wrench receiving portion 14 as well as a portion 15 for assembly with a connecting part, the details of this latter portion being unimportant insofar as this invention is concerned. The apertured body B has a bore 16 which is somewhat larger in diameter than the bore 17 which permits flow of fluid, a shoulder 19 being provided due to the difference in diameters of the bores. The body B may also be provided with an internal tapered surface 18 which may be more or less complementary to the tapered surface 6a on the rubber ring R.

The method whereby the gripping sleeve S is initially deformed about the tube T is shown in Fig. 2. The nut N is first slipped over the tube, followed by the sleeve S. Member F is a special part which cooperates with nut N to deform sleeve S about the tube. The piece F is employed to deform the metal sleeve S about the tube in order that the actual fitting body B which is used with the rubber ring, may be designed to advantageously work with the rubber ring. As shown in Fig. 2 the internal tapered surface 4 of the nut N is complementary to the tapered surface 11 on the metal ring S. The nut is threaded to a threaded portion 23 of the special body F, this member also having an internal relatively shallow tapered surface 24 and a radial shoulder portion 25. The special piece F is also provided with a wrench receiving portion 26. When the nut N and the ring S are slipped over the tube the nut and special body piece F are tightened relative to one another, so that tapered surface 4 on the nut engages the mating surface on the ring S and urges the ring into the space defined by the shallow tapered surface 24 on the special body F, and the tube. The tube is simultaneously forced against the abutment 25 on the body F so that it cannot move. The tapered surface 24 on the special body causes radial deformation with the sleeve whereby the shoulder 12a is deformed and cuts and shears into the tube. Any tendency of the tube to move axially is resisted by the abutment shoulder 25 on the body. After the ring S is firmly attached to the tube, the assembly coupling parts N and F are unthreaded and part F is removed from the tube.

When the coupling is assembled, as in Fig. 3, the rubber ring R is slipped over the gripping sleeve S. The aperture 16 on the body B is slightly larger in diameter than the outside diameter of the tube so that the tube cannot vibrate against the body B. As the nut N is tightened the tapered surface 18 on the body tends to compress the rubber ring about the sleeve, which causes radial pressure in the area of the cutting edge 12a of the sleeve. Likewise, the flange 2 on the nut axially presses against the rubber ring R and augments the sealing and gripping engagement between the rubber ring R and the sleeve S. Tightening of the parts is continued until the tapered surface 4 on the nut engages the complementary surface on the exterior of the gripping sleeve S. Further tightening tends to advance both tube and sleeve along the rubber ring R causing it to flow and assume a shape accurately conforming to the configuration of the parts. Excessive tightening of the nut N is not required in order to produce a satisfactory joint and such is not recommended.

The combination of rubber ring and tube biting sleeve firmly compressed together and gripped by the nut as shown in Fig. 3 has been found to produce an exceptionally dependable joint in applications where high pressures and extreme vibration are required. In fact, I have conducted tests on my fitting using a half inch tubing and fittings proportioned substantially as illustrated and have found that in many cases no failure or leakage of the tube are noticeable after the application of 10,000,000 oscillations by a vibrating machine, with the tube and fitting assembly subjected to 3,000 pounds per square inch pressure. I have also found that my fitting, when assembled with a tube, will stand as many as 100,000 cycles of impulse pressure varying from 0 to 3,000 p. s. i. at 35 cycles per minute without failure. These results far exceed those obtainable with any rubber cushioned tube couplings in the prior art available for test.

The fitting shown in Figs. 4 and 5 is a modified embodiment of my invention. The rubber ring R', as shown in Fig. 4, includes a generally radially extending flanged portion 30 at one end and another flanged portion 32 at the other end with an internal recess 31 and external tapered surfaces 33 and 34. Before the ring is applied to the tube the modified body B' and the nut N' shown in Fig. 5 are used to initially clamp the sealing ring S into the biting engagement with the tube as was done in the auxiliary fitting shown in Fig. 2. In the modification shown in Fig. 5 the parts are formed so that the initial deformation of the ring S may be done in the same nut and body fittings that eventually clamp the rubber ring R'.

The body B' includes a threaded portion 38 terminating in an internal tapered surface 39 which may join a second tapered surface 41 the vertex angle of which is relatively shallow. A shoulder 40 is provided to engage the end of the tube during the initial deformation of the fitting as was shown in Fig. 2. The wrench receiving section 42 and the portion 43 for attachment to a connecting part are conventional.

After the nut N' and body B' are tightened with the rubber ring omitted, to initially deform the sleeve S about the tube as shown in Fig. 2, they are disassembled and the rubber ring R' is snapped around the sleeve S. The parts are then retightened and the rubber ring R' is caused to firmly surround and grip tube T and the ring S as well as to tightly engage the tapered portion 39 on the body B'. Further tightening causes the portion at 36 and the nut N' to engage the other end of the rubber ring R' and augment the sealing action. When this fitting is finally tightened the pressure of the rubber ring R' about the ring S causes an effective seal to be produced under both impulse pressure loads and vibration forces. It has been found that this modification will withstand pressures and loading without failure like those described in connection with the first embodiment.

Having described my novel fitting in detail, it can be seen how I have provided a fitting which shows superior resistance to failure under impulse loads and vibratory forces. Reference has already been made to results obtained in actual tests of my fitting. Those skilled in the art will appreciate that modifications may be made without departing from the scope of my invention. The exact angles of taper shown in these drawings are illustrative and may be varied without affecting the operation of the fitting. However, it is important that for best results under vibratory loads the end of the tube T be clear the adjacent portion of its respective fitting body B and B'. Of course, the portion of the fitting to which the other parts connect may be made in any desired shape depending upon the use to which the device is put. The ring S is preferably made of material harder than that of the tube with which it is used. I have found that steel and stainless steel rings give very good results. However, the composition of the ring is determined by that of the tube and the pressure which must be withstood. Although I have stated that the flexible rings R and R' are made of rubber, it is understood that the term rubber as used in the specification and claims includes various synthetic material which function like and are commonly classed with rubber. These and other modifications may be made without departing from the scope of my invention as defined in the appended claims.

Having thus described the present invention so that others skilled in the art may be able to understand and practice the same, I state that what I desire to secure by Letters Patent is defined in what is claimed.

What I claim is:

1. In a tube coupling, a coupling body member, a nut having an abutment flange, a deformable metallic tube gripping sleeve member and a rubber ring member, said sleeve member having a cutting edge for shearing and displacing material of a tube, said rubber ring surrounding and bodily engaging all exposed surfaces of said sleeve member when the parts are assembled with a tube, said nut being threaded to said body member with its abutment flange engaging the rear portion of said rubber ring, the nut and tapered body parts being formed to provide a recess to receive and be partially filled by said rubber ring and to apply radial and axial pressure on said ring whereby a vibration resistant joint is provided.

2. In a tube coupling, a coupling body member, a nut having an abutment flange, a deformable metallic tube gripping sleeve member and a rubber ring member, said sleeve member having a cutting edge for shearing and displacing material of a tube, said rubber ring surrounding and bodily engaging all exposed surfaces of said sleeve member when the parts are assembled with a tube, said nut being threaded to said body member with its abutment flange engaging the rear portion of said rubber ring, said body member having an internal generally tapered portion, the nut and tapered body parts being formed to provide a recess to receive and be partially filled by said rubber ring with the tapered portion of said body surrounding the cutting edge of said ring, said parts being arranged to apply axial pressure on said ring and radial pressure adjacent its cutting edge whereby a vibration resistant joint is provided.

3. In a tube coupling, an axially apertured body member for receiving the end of a tube, the aperture in said body member being formed with a rearwardly-facing, outwardly-flaring surface, a metallic tube-cutting sleeve having a nose portion formed with an internal cutting edge adapted to be deformed into a groove in the material of a tube before assembly of the tube and sleeve in the coupling, a nut threaded to said body member, said nut, tube-cutting sleeve, and rearwardly-facing, flared body surface being arranged to form an annular cavity, a rubber ring within said annular cavity and surrounding a substantial portion of said cutting sleeve; said rubber ring, with the nut tightened and with the fitting assembled with a tube being in resilient pressure engagement with said flaring body surface, with the nose of said cutting sleeve, and with said nut, said rubber ring also having a portion forward of said cutting sleeve for resilient sealing engagement with the tube, there being a clearance space between a portion of said rubber ring and an adjacent wall portion of said cavity with the nut tightened, to permit limited flow of the material of said ring after the nut is tightened and thereby provide a flexible, vibration-resistant joint.

4. In a tube coupling, an axially apertured body member for receiving the end of a tube, the aperture in said body member being formed with a rearwardly-facing outwardly-flaring surface, a metallic tube-cutting sleeve having a nose portion formed with an internal cutting edge adapted to be deformed into a groove in the material of a tube before assembly of the tube and sleeve in the coupling, a nut threaded to said body member, said nut, tube-cutting sleeve, and rearwardly-facing, flared body surface being arranged to form an annular cavity, a rubber ring within said annular cavity and surrounding a substantial portion of said cutting sleeve, said rubber ring having an inner surface molded to fit said sleeve, said rubber ring, with the nut tightened and with the fitting assembled with a tube being in resilient pressure engagement with said flaring body surface, with the nose of said cutting sleeve, and with said nut, said rubber ring also having a portion forward of said cutting sleeve for resilient sealing engagement with the tube, there being a clearance space between a portion of said rubber ring and an adjacent wall portion of said cavity with the nut tightened, to permit limited flow of the material of said ring after the nut is tightened and thereby provide a flexible, vibration-resistant joint.

5. In a tube coupling, an axially apertured body member for receiving the end of a tube, the aperture in said body member being formed with a rearwardly-facing, outwardly-flaring surface, a metallic tube-cutting sleeve having a rearward abutment portion and a forward nose portion formed with an internal cutting edge adapted to be deformed into a groove in the material of a tube before assembly of the tube and sleeve in the coupling, a nut threaded to said body member and having a shoulder for engaging the abutment portion of said sleeve, said nut, tube-cutting sleeve, and rearwardly-facing, flared body surface being arranged to form an annular cavity, with said flared surface overlying the nose of said cutting sleeve, a rubber ring within said annular cavity and surrounding a substantial portion of said cutting sleeve; said rubber ring, with the nut tightened and with the fitting assembled with a tube being in resilient pressure engagement with said flaring body surface, with the nose of said cutting sleeve, and with said nut, said rubber ring also having a portion forward of said cutting sleeve for resilient sealing engagement with the tube, there being a clearance space between a radially outer portion of said rubber ring and an adjacent wall portion of said cavity with the nut tightened, to permit limited flow of the material of said ring after the nut is tightened, thereby providing a flexible, vibration-resistant joint.

6. In a tube coupling, an axially apertured body member for receiving the end of a tube, the aperture in said body member being formed with a rearwardly-facing, outwardly-flaring surface, a metallic tube-cutting sleeve having a rearward abutment portion and a forward nose portion formed with an internal cutting edge adapted to be deformed into a groove in the material of a tube before assembly of the tube and sleeve in the coupling, a nut threaded to said body member and having a shoulder for engaging the abutment portion of said sleeve, said nut, tube-cutting sleeve, and rearwardly-facing, flared body surface being arranged to form an annular cavity, with said flared surface overlying the nose of said cutting sleeve, said rubber ring having an inner surface molded to fit said sleeve, a rubber ring within said annular cavity and surrounding a substantial portion of said cutting sleeve; said rubber ring, with the nut tightened and with the fitting assembled with a tube being in resilient pressure engagement with said flaring body surface, with the nose of said cutting sleeve, and with said nut, said rubber ring also having a portion forward of said cutting sleeve for resilient sealing engagement with the tube, there being a clearance space between a radially outer portion of said rubber ring and an adjacent wall portion of said cavity with the nut tightened, to permit limited flow of the material of said ring after the nut is tightened, thereby providing a flexible, vibration-resistant joint.

ROBERT E. HEROLD.

REFERENCES CITED

The following references are of record in the file of this patent:

UNITED STATES PATENTS

| Number | Name | Date |
| --- | --- | --- |
| 2,139,413 | Kreidel | Dec. 6, 1938 |
| 2,232,513 | Confer | Feb. 18, 1941 |
| 2,394,351 | Wurzburger | Feb. 5, 1946 |